(12) United States Patent
Yagi

(10) Patent No.: US 8,379,332 B2
(45) Date of Patent: Feb. 19, 2013

(54) SCREW COMPONENT AND IMAGE CAPTURING DEVICE

(75) Inventor: Fumiya Yagi, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/128,520

(22) PCT Filed: Dec. 1, 2009

(86) PCT No.: PCT/JP2009/006489
§ 371 (c)(1),
(2), (4) Date: May 10, 2011

(87) PCT Pub. No.: WO2010/064400
PCT Pub. Date: Jun. 10, 2010

(65) Prior Publication Data
US 2011/0235193 A1    Sep. 29, 2011

(30) Foreign Application Priority Data
Dec. 3, 2008  (JP) .................. 2008-308170

(51) Int. Cl.
*G02B 7/02* (2006.01)
*G02B 15/14* (2006.01)

(52) U.S. Cl. ........................................ 359/819; 359/699
(58) Field of Classification Search .......... 359/694–704, 359/811–830
See application file for complete search history.

(56) References Cited

U.S. PATENT DOCUMENTS

| | | | |
|---|---|---|---|
| 6,522,481 B2 * | 2/2003 | Nomura et al. | 359/699 |
| 7,796,347 B2 * | 9/2010 | Ito | 359/696 |
| 8,018,661 B2 * | 9/2011 | Ito | 359/696 |
| 2008/0291549 A1 * | 11/2008 | Yoshida et al. | 359/699 |

FOREIGN PATENT DOCUMENTS

| | | |
|---|---|---|
| EP | 0882897 A1 | 12/1998 |
| JP | 60-084514 | 5/1985 |
| JP | 60-084519 A | 5/1985 |
| WO | PCT/JP2009/006489 | 3/2010 |

* cited by examiner

Primary Examiner — Mohammed Hasan
(74) Attorney, Agent, or Firm — RatnerPrestia

(57) ABSTRACT

A screw component including lens holder and lens barrel component engaged with each other, and protruding portions respectively provided on each of both flanks of screw thread of lens holder. When lens holder is engaged with the lens barrel component, screw thread of lens holder is brought into contact with both flanks of a screw thread of the lens barrel component, it is possible to prevent lens holder and the lens barrel component from being displaced from each other.

8 Claims, 8 Drawing Sheets

SCREW COMPONENT AND IMAGE CAPTURING DEVICE

THIS APPLICATION IS A U.S. NATIONAL PHASE APPLICATION OF PCT INTERNATIONAL APPLICATION No. PCT/JP2009/006489.

TECHNICAL FIELD

The present invention relates to a screw component having a pair of screw members engaged with each other, and it also relates to an image capturing device including a lens holder holding a lens inside thereof and a lens barrel component engaged with the lens holder so as to hold the lens holder.

BACKGROUND ART

Conventionally, as a screw component including a pair of screw members engaged with each other, an image capturing device has been known. The image capturing device includes a lens holder holding a lens inside thereof, and a lens barrel component engaged with the lens holder so as to hold the lens holder. In such an image capturing device, in order to photograph a high quality image, it is necessary to position the lens with respect to an image capturing element disposed in the lower and inner part of the lens barrel component with an accurate distance.

Thus, an image capturing device in which a protruding portion is provided on a flank of a screw thread in a lens holder has been proposed (see, for example, Patent Document 1). In such an image capturing device, the protruding portion provided on one of the flanks of the screw thread of the lens holder is brought into contact with one of the flanks of the screw thread of the lens barrel component, thereby preventing the lens holder from being displaced with respect to the lens barrel component.

However, in the above-mentioned conventional image capturing device, for example, due to variation in accuracy of components at the time of manufacturing lens holders or lens barrel components, when the other flank of the screw thread of the lens holder is not brought into contact with the other flank of the screw thread of the lens barrel component, the lens holder may be displaced from the lens barrel component. Furthermore, in order to prevent such a position displacement considering that the lens holder is thermally expanded, high manufacturing accuracy of the lens holder and the lens barrel component is required.

In view of such circumstances, the present invention provides a screw component in which a pair of screw members engaged with each other can be reliably prevented from being displaced from each other.

Furthermore, the present invention provides an image capturing device in which a lens holder and a lens barrel component can be reliably prevented from being displaced from each other.

CITATION LIST

Patent Literature

[Patent Literature 1] Japanese Patent Application Unexamined Publication No. S60-84514

SUMMARY OF THE INVENTION

A screw component in accordance with the present invention includes a pair of screw members engaged with each other, and protruding portions respectively provided on both flanks of a screw thread of one screw member of the pair of screw members. When the one screw member is engaged with the other screw member of the pair of screw members, the screw thread of the one screw member is brought into contact with both flanks of a screw thread of the other screw member of the pair of screw members, respectively.

According to the screw component of the present invention, since the one screw member includes the protruding portions on the both flanks of the screw thread respectively, when one screw member is engaged with the other screw member, the screw thread of the one screw member is brought into contact with the both flanks of the screw thread of the other screw member, respectively.

Thus, it is possible to reliably prevent the pair of screw members engaged with each other from being displaced from each other.

Furthermore, the image capturing device in accordance with the present invention includes a lens holder holding a lens inside thereof and a lens barrel component engaged with the lens holder and holding the lens holder. The image capturing device includes the above-mentioned screw component in which the pair of screw members are the lens holder and the lens barrel component.

According to the image capturing device of the present invention, the lens holder (or the lens barrel component) includes protruding portions on the both flanks of the screw thread, respectively. Therefore, when the lens holder (or the lens barrel component) and the lens barrel component (or the lens holder) are engaged with each other, the screw thread of the lens holder (or the lens barrel component) is brought into contact with the both flanks of the screw thread of the lens barrel component (or the lens holder), respectively.

Thus, it is possible to reliably prevent the lens holder and the lens barrel component engaged with each other from being displaced from each other.

DETAILED DESCRIPTION OF THE PREFERRED EMBODIMENTS

Figure 1:
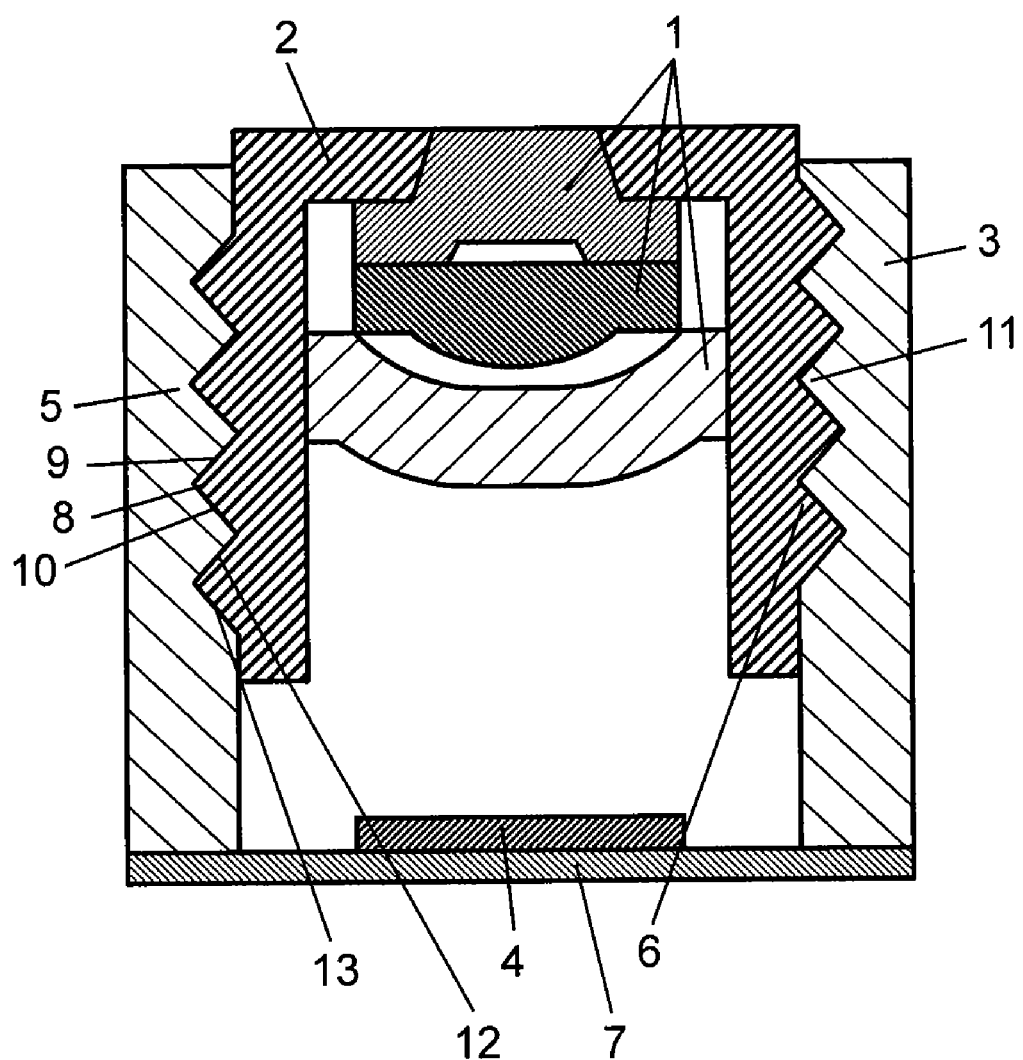
FIG. 1 is an entire sectional view showing an image capturing device in accordance with an exemplary embodiment of the present invention.
Figure 2A:
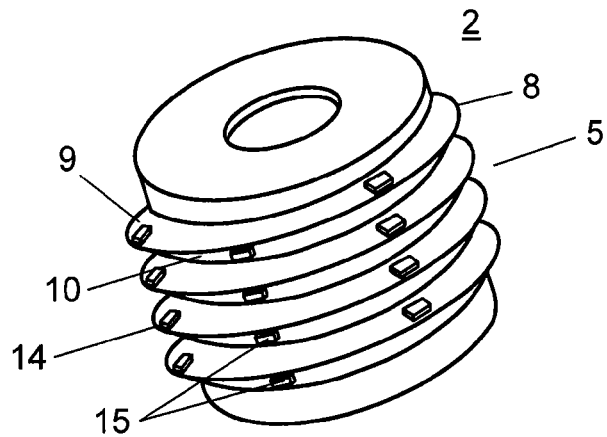
FIG. 2A is an entire perspective view showing a lens holder of the image capturing device in accordance with the exemplary embodiment.
Figure 2B:
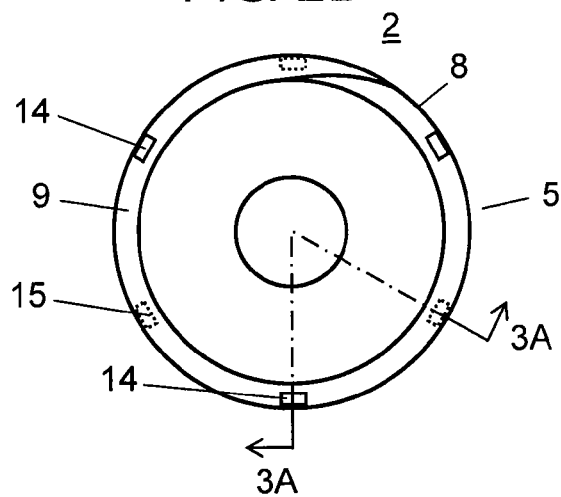
FIG. 2B is an entire plan view showing the lens holder of the image capturing device in accordance with the exemplary embodiment.
Figure 2C:
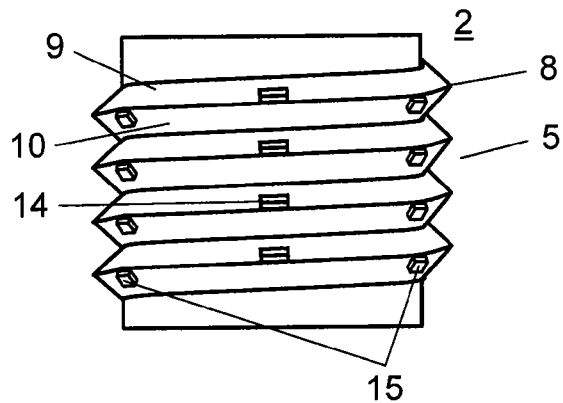
FIG. 2C is an entire front view showing the lens holder of the image capturing device in accordance with the exemplary embodiment.

Hereinafter, an exemplary embodiment of a screw component in accordance with the present invention is descried with reference to FIGS. 1 to 3B. Note here that, this exemplary embodiment describes a case in which the screw component is employed for an image capturing device.

An image capturing device in accordance with this exemplary embodiment includes, as shown in FIG. 1 and FIGS. 2A to 2C, lens holder 2 holding at least one lens 1 inside thereof, lens barrel component 3 engaged with lens holder 2 to hold lens holder 2, and image capturing element 4 disposed in the lower part of lens barrel component 3. Herein, in this exemplary embodiment, lens holder 2 is "one screw member" of the present invention and lens barrel component 3 is "the other screw member" of the present invention.

In the image capturing device, screw portion 5 provided on the outer peripheral portion of cylindrical lens holder 2 and screw portion 6 provided on the inner peripheral portion of cylindrical lens barrel component 3 are engaged with each other. Thus, the positions of lens 1 and image capturing element 4 can be relatively changed from each other, so that a focal length between lens 1 and image capturing element 4 can be adjusted. Note here that lens barrel component 3 is fixed to substrate 7 on which image capturing element 4 is placed, so that lens barrel component 3 is formed integrally with image capturing element 4. Furthermore, lens holder 2 and lens barrel component 3 are formed of a metallic material or a resin material. It is preferable in terms of cost that at least one of lens holder 2 as an interchangeable part and lens barrel component 3 is formed of resin materials such as an acrylic resin, a methacrylic resin, a polycarbonate resin, and polyimide.

Lens holder 2 includes screw thread 8 provided extending spirally on screw portion 5 on the outer peripheral portion. Specifically, lens holder 2 has screw thread 8 whose cross section is formed in a triangle shape by a pair of inclined surfaces, that is, a pair of flanks (surfaces communicating between the top and bottom of screw thread 8) 9 and 10. Screw thread 8 extends spirally downward in FIG. 1. Thus, lens holder 2 includes a plurality of protruding portions 14 and 15 on both flanks 9 and 10 of screw thread 8 so that screw thread 8 is brought into contact with both flanks 12 and 13 of screw thread 11 of lens barrel component 3 when lens holder 2 is engaged with lens barrel component 3 (see FIGS. 2A to 2C). Specifically, a plurality of protruding portions 14 are provided on each of flanks 9 of screw thread 8 (upper side in FIGS. 2A and 2C). Furthermore, a plurality of protruding portions 15 are provided on each of flanks 10 of screw thread 8 (lower side in FIG. 2A and FIG. 2C).

Protruding portions 14 and 15 protrude orthogonally from flat flanks 9 and 10, and provided extending along the circumferential direction. Protruding portions 14 and 15 are provided on both flanks 9 and 10 at every pitch of screw thread 8.

Furthermore, protruding portions 14 provided on one flank 9 and protruding portions 15 provided on flank 10 are disposed separately from each other along screw thread 8. Specifically, protruding portions 14 and 15 are alternately provided on one flank 9 and the other flank 10 along screw thread 8 provided extending spirally, and provided at equal intervals along the circumferential direction.

Thus, predetermined two protruding portions 14 among protruding portions 14 provided on one flank 9 and a predetermined one protruding portion among protruding portions 15 provided on the other flank 10 are disposed separately from each other in the circumferential direction.

Herein, the above-mentioned screw mechanism is described in detail. Firstly, in FIG. 3A, broken line P shows a contour of a cross section of screw thread 11 of lens barrel component 3 in a state in which the substantial volume is the smallest, that is, in a state in which lens barrel component 3 is engaged with lens holder 2 most loosely due to error or variation in manufacturing. On the other hand, on the contrary, broken line Q shows a contour of a cross section of screw thread 11 of lens barrel component 3 in a state in which the substantial volume is the largest, that is, in a state in which lens barrel component 3 is engaged with lens holder 2 most tightly.

Therefore, the shape of screw thread 11 of lens barrel component 3 with which screw thread 8 of lens holder 2 is engaged varies in the range between broken line P and broken line Q. Herein, separation distance between broken line P and broken line Q is denoted by d. It is desirable that the protruding height of protruding portions 14 from flank 9 and the protruding height of protruding portions 15 from flank 10 are equal to or higher than a distance between flank 9 or 10 and broken line P. Therefore, preferable condition of protruding height h1 of protruding portion 14 or 15 from broken line Q is expressed by h1≧d.

On the other hand, screw thread 8 of lens holder 2 is formed such that flank 9 or 10 has an offset in the inner side from broken line Q, that is, the side in which the substantial volume of lens holder 2 is small. It is desirable that the size h2 of the offset (FIG. 3A) is equal to or larger than protruding height h1 of protruding portion 14 or 15 from broken line Q. Therefore, the preferable condition of screw thread 8 of lens holder 2 is expressed by h2≧h1.

Herein, as shown in broken line P, when screw thread 11 of lens barrel component 3 is formed such that it is engaged with lens holder 2 most loosely, screw thread 8 of lens holder 2 is brought into contact with screw thread 11 of lens barrel component 3 at the top of protruding portion 14 or 15. Thus, backlash does not occur between lens holder 2 and lens barrel component 3.

Figure 3A:
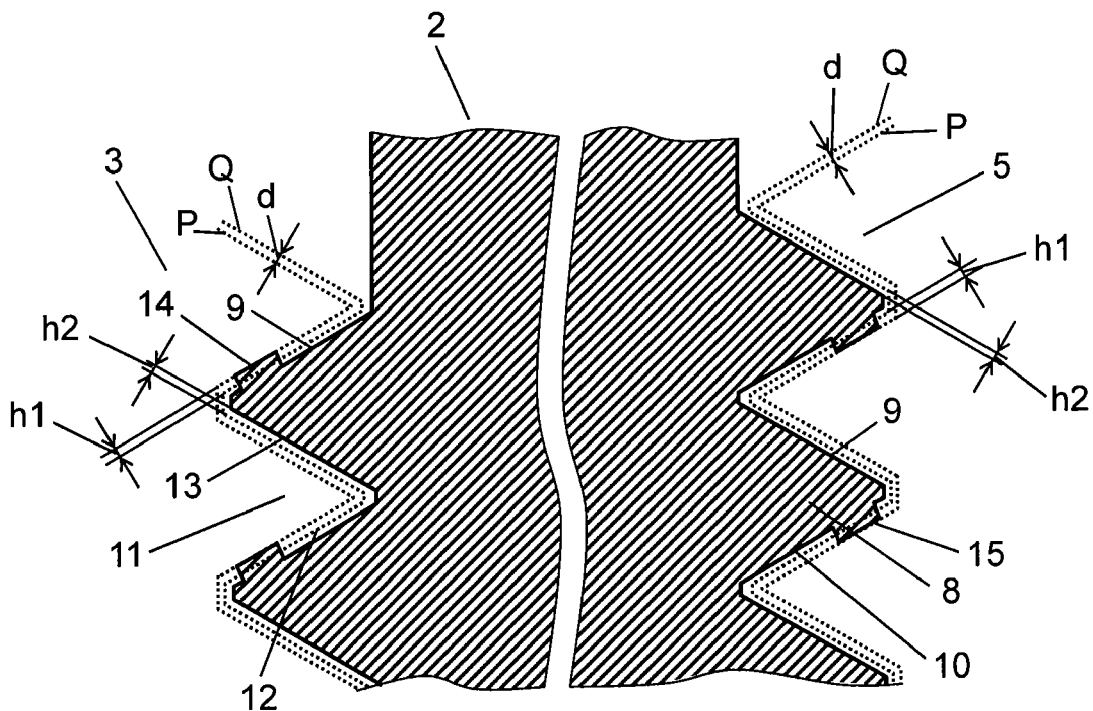
FIG. 3A is a sectional view showing the image capturing device of FIG. 2 taken along line 3A-3A before being screwed.
Figure 3B:
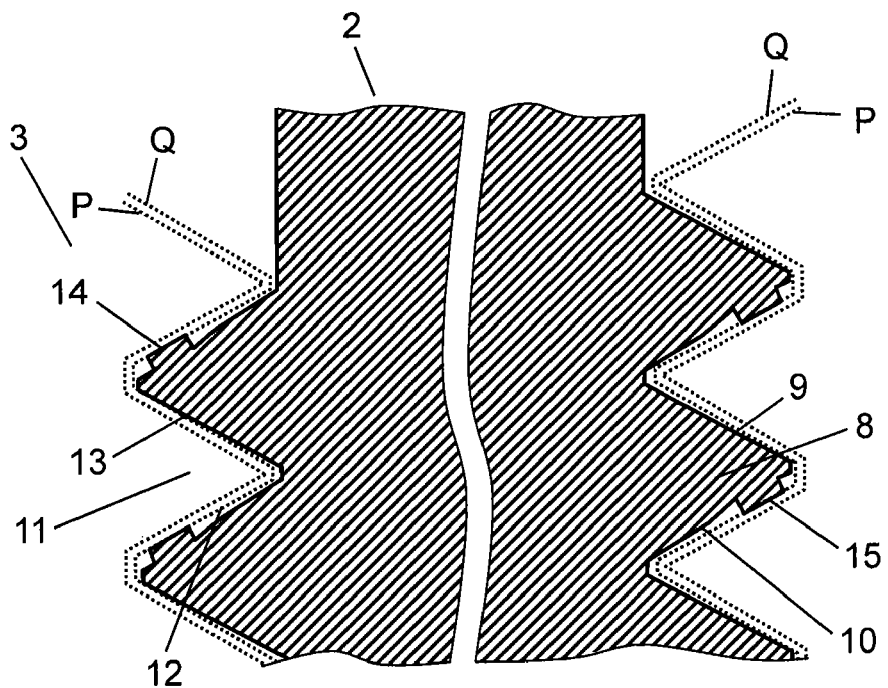
FIG. 3B is a sectional view showing the image capturing device of FIG. 2 taken along line 3A-3A after being screwed.

On the contrary, as shown in broken line Q, when screw thread 11 of lens barrel component 3 is formed such that it is engaged with lens holder 2 most tightly, screw thread 11 of lens barrel component 3 interferes with protruding portion 14 or 15 of screw thread 8 of lens holder 2. Since there is a gap (offset) between screw thread 8 of lens holder 2 (strictly, flank 9 or 10) and screw thread 11 of lens barrel component 3, as shown in FIG. 3B, protruding portion 14, in the upper side of the drawing, on flank 9 of screw thread 8 of lens holder 2 is bent downward to be deformed. Furthermore, protruding portion 15, in the lower side of the drawing, on flank 10 of screw thread 8 of lens holder 2 is pushed and bent to the upside of the drawing.

In this way, since the protruding portions provided on one flank and the protruding portions provided on the other flank are disposed separately from each other along the screw thread, a site of the screw thread on which the protruding portion provided on one flank is positioned and a site of the screw thread on which the protruding portion provided on the other flank is positioned bend in the different directions from each other when they are pressed by the corresponding screw thread. In other words, if the spiral of the screw is developed on the plane, wave-like deformation occurs.

Thus, even if the pair of screw members engaged with each other have a dimension error within a predetermined range, they are always supported with each other in balance in a neutral position, so that backlash does not occur between lens holder 2 and lens barrel component 3. In other words, it is possible to suppress displacement of the center of axes of the pair of screw members. Furthermore, since screw thread 8 of lens holder 2 changes its shape, when it is screwed, the rotation torque due to interference of the screws is prevented from becoming excessive, thus preventing screwing from becoming impossible.

As mentioned above, in an image capturing device in accordance with this exemplary embodiment, when lens holder 2 and lens barrel component 3 are engaged with each other, since protruding portion 14 or 15 of screw thread 8 of lens holder 2 is brought into contact with each of the both flanks 12 and 13 of screw thread 11 of lens barrel component 3, it is possible to reliably prevent displacement between lens holder 2 and lens barrel component 3. Therefore, it is possible to prevent lens 1 from being displaced with respect to image capturing element 4, thus enabling high quality images to be provided.

Furthermore, when lens holder 2 and lens barrel component 3 are engaged with each other, and when they are engaged with each other while a rotation torque within an appropriate range is maintained, displacement between lens holder 2 and lens barrel component 3 can be prevented easily with little restriction such as selection of component materials, and by low-cost means.

For example, in a method of manufacturing lens holder 2 by molding using a mold, lens holder 2 can be easily manufactured by procedure in which the spiral shape of screw thread 8 as a basic shape is once formed in the mold, and then portions corresponding to protruding portions 14 and 15 are engraved in a secondary process. Note here that manufacturing cost of the mold is not so high as compared with the case in which a mold for usual lens holders without having protruding portions is manufactured. Furthermore, depending upon the shapes of protruding portions 14 and 15, lens holder 2 can be manufactured by using a simple split type mold.

Furthermore, in the image capturing device in accordance with this exemplary embodiment, since a plurality of protruding portions 14 and 15 are disposed alternately on one flank 9 and the other flank 10 along the spiral of screw thread 8, the direction of deformation of screw thread 8 becomes upward and downward alternately along the spiral of screw thread 8. Thus, it is possible to prevent lens holder 2 from tilting in a specific direction.

Therefore, due to manufacturing error and variation, from a case of screwing between lens holder 2 and lens barrel component 3 is finished loosely to a case in which the screwing is finished tightly, screwing between lens holder 2 and lens barrel component 3 can be maintained within an appropriate range of rotation torque, and it is possible to prevent screwed lens holder 2 and lens barrel component 3 from being displaced from each other.

Note here that the screw component and the image capturing device in accordance with the present invention are not necessarily limited to the above-mentioned exemplary embodiment. Various modifications can be added within the scope that does not deviate from gist of the present invention.

Figure 4A:
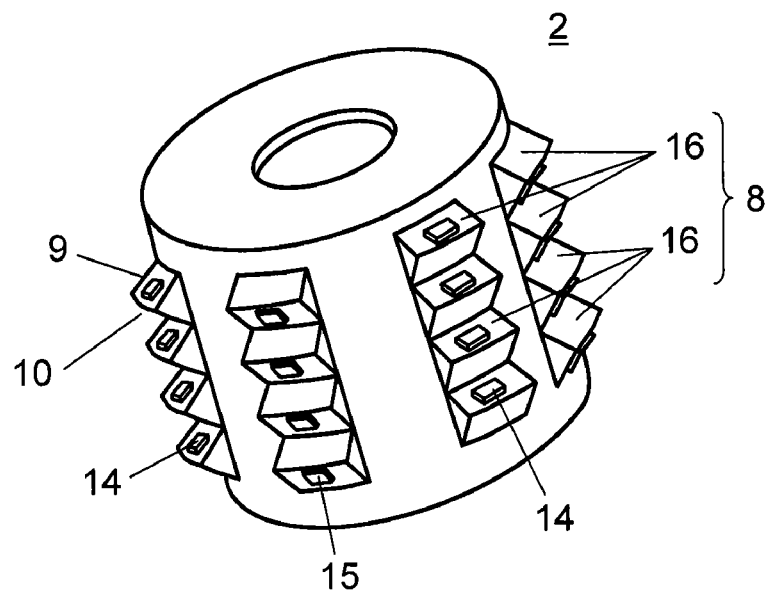
FIG. 4A is an entire perspective view showing a lens holder in accordance with another exemplary embodiment of the present invention.

For example, in the screw component and the image capturing device in accordance with the above-mentioned exemplary embodiment, a case in which screw thread 8 of lens holder 2 as one screw member is continuously formed is described. However, screw thread 8 is not limited to such a case, as shown in FIG. 4A, screw thread 8 of lens holder 2 as one screw member is formed into a discontinuous configuration. That is to say, screw thread 8 may be formed of a plurality of screw thread pieces 16. In this case, screw thread 11 of lens barrel component 3 as the other screw member is formed continuously.

Figure 4B:
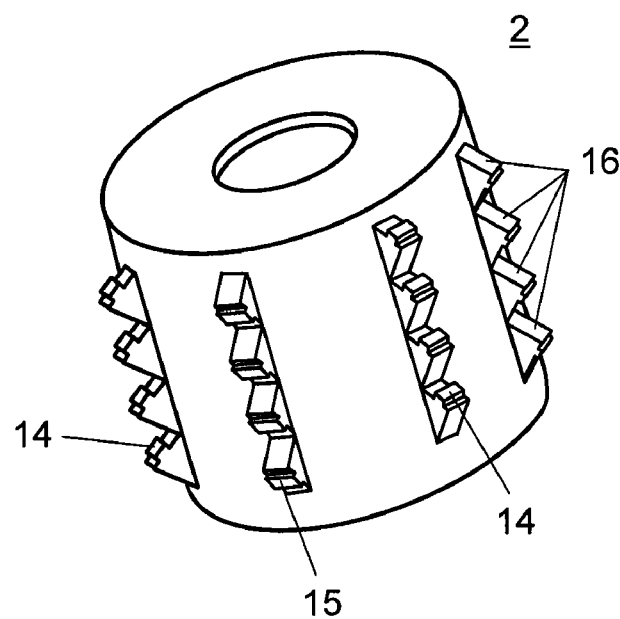
FIG. 4B is an entire perspective view showing a modified example of the lens holder in accordance with the exemplary embodiment.

Furthermore, when such a configuration is employed, as shown in the modification example of FIG. 4B, the length of each screw thread piece 16 may be short to the utmost limit. Thus, each screw thread piece 16 and protruding portions 14 and 15 are hardly different from each other as shape elements, and they are recognized as a single shape element.

Thus, in one screw member, since the screw thread is formed into a discontinuous configuration, for example, processing for forming protruding portions can be facilitated, and materials to be used for manufacturing can be reduced.

Furthermore, in the screw component and the image capturing device in accordance with the above-mentioned exemplary embodiment, the case in which each of screw threads 8 and 11 has triangle-shaped cross-section is described. However, they are not necessarily limited to this case, and they may be formed in other cross-sectional shapes, for example, a trapezoidal screw thread or rectangular thread.

Figure 5A:
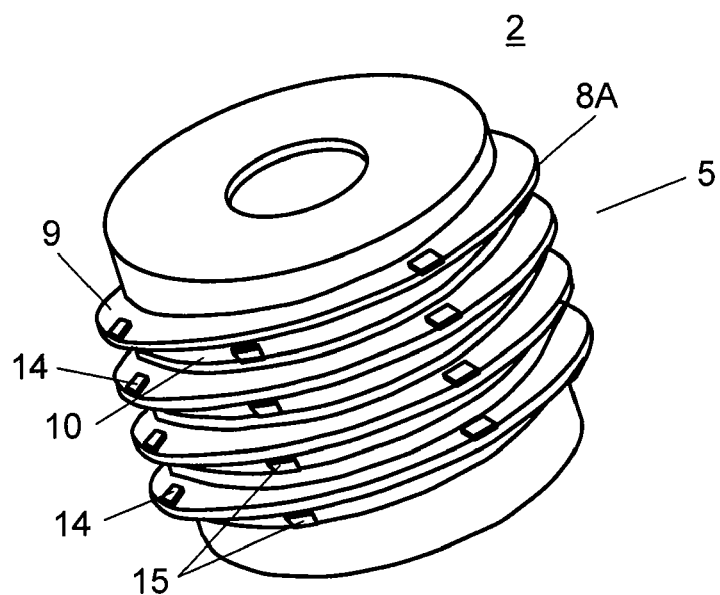
FIG. 5A is an entire perspective view showing a lens holder of an image capturing device in accordance with still another exemplary embodiment of the present invention.
Figure 5B:
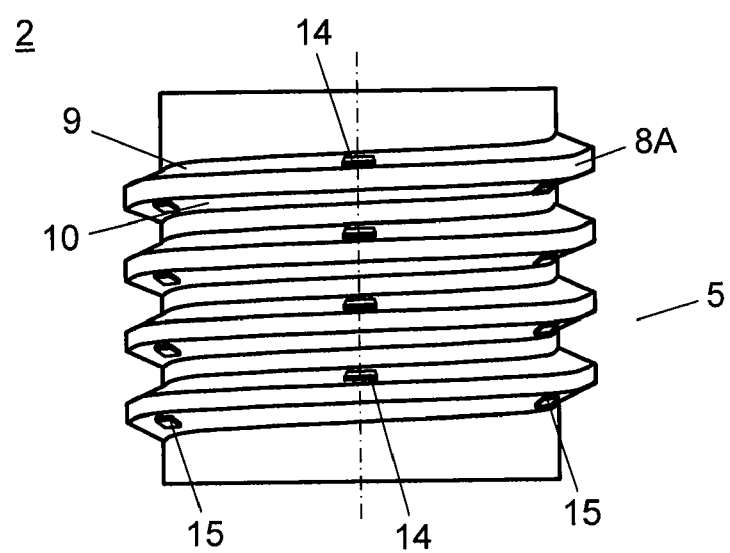
FIG. 5B is an entire perspective view showing the lens holder of the image capturing device in accordance with the exemplary embodiment.

FIG. 5A is a perspective view showing a lens holder having a screw thread having a trapezoidal cross-sectional shape. FIG. 5B is a side view thereof. In FIGS. 5A and 5B, screw portion 5 of lens holder 2 has screw thread 8A having a trapezoidal cross-sectional shape. One flank 9 forming screw thread 8A includes protruding portions 14. The other flank 10 forming screw thread 8A includes protruding portions 15. Also in this exemplary embodiment, protruding portions 14 and 15 are alternately disposed at an equal interval on one flank 9 and the other flank 10 with respect to screw thread 8A.

Figure 6A:
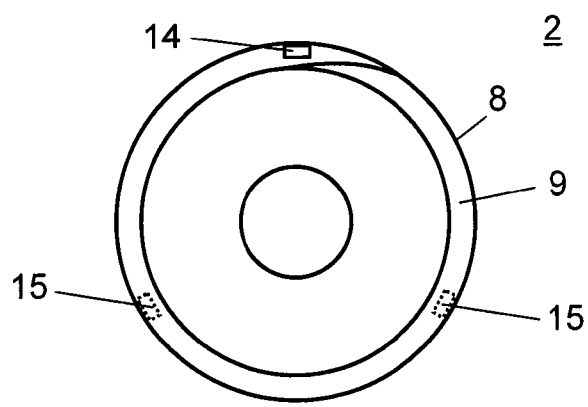
FIG. 6A is a plan view showing a lens holder in accordance with yet another exemplary embodiment of the present invention.
Figure 6B:
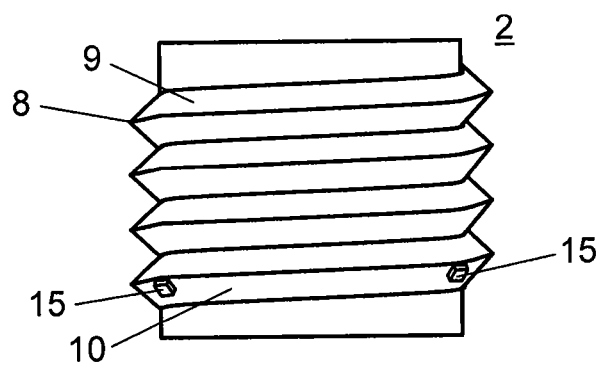
FIG. 6B is a front view showing the lens holder.
Figure 6C:
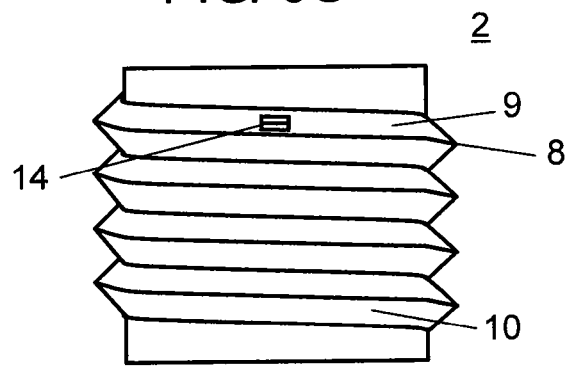
FIG. 6C is a rear view showing the lens holder.

Furthermore, in the screw component and the image capturing device in accordance with the above-mentioned exemplary embodiment, a case in which protruding portions 14 and 15 are provided alternately on flanks 9 and 10 along screw thread 8 and provided at equal intervals along the circumferential direction, but not limited to this case. That is to say, protruding portions 14 and 15 may be disposed substantially at an equal interval or partially irregularly. Furthermore, designing of protruding portions 14 and 15, including the number of spiral rotations of screw thread 8, can be carried out freely, and positions of protruding portions 14 and 15 can determined freely. For example, as shown in FIGS. 6A to 6C, only one of protruding portion 14 and 15 may be provided on one flank 9 and only two of protruding portions 14 and 15 may be provided on the other flank 10.

Figure 7:
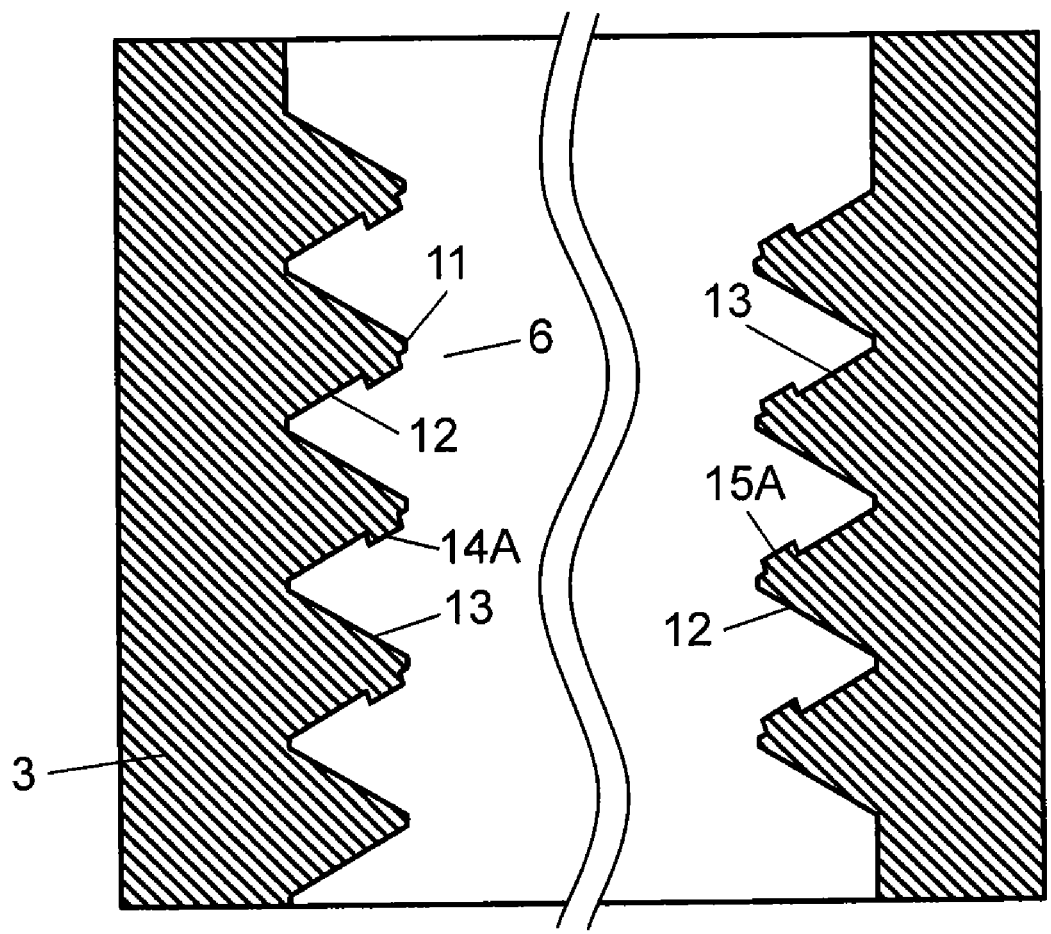
FIG. 7 is a schematic sectional view showing a lens barrel component of an image capturing device in accordance with a further exemplary embodiment of the present invention.

Furthermore, in the screw component and the image capturing device in accordance with the above-mentioned exemplary embodiment, a case in which protruding portions 14 and 15 are provided on screw thread 8 of lens holder 2 are provided is described, but not limited to this case, and protruding portions 14 and 15 may be provided on screw thread 11 of lens barrel component 3. FIG. 7 is a sectional view showing a lens barrel component whose screen threads are provided with protruding portions. In FIG. 7, screw portion 6 of lens barrel component 3 has screw thread 11 having a triangle shaped cross section. One flank 12 forming screw thread 11 includes protruding portion 14A. The other flank 13 forming screw thread 11 includes protruding portions 15A. Protruding portions 14A and 15A are provided separately from each other along screw thread 11. Furthermore, protruding portions 14A and 15A are provided at every pitch of screw thread 11. Furthermore, protruding portions 14A and 15A are provided alternately on one flank 12 and the other flank 13 along screw thread 11. Furthermore, protruding portions 14A and 15A are provided at equal intervals along the circumferential direction.

In this exemplary embodiment, lens barrel component 3 is "one screw member" of the present invention and lens holder 2 is "the other screw member" of the present invention. Also in this case, as mentioned above, screw threads 11 at lens barrel component 3 side may be formed into a discontinuous configuration.

Figure 8A:
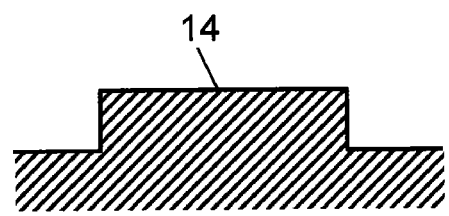
FIG. 8A is a sectional view in the circumferential direction of a protruding portion of the lens holder.
Figure 8B:
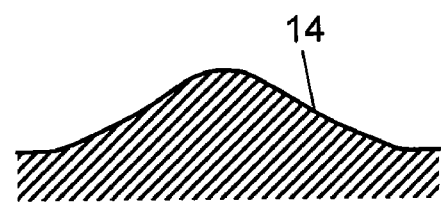
FIG. 8B is a sectional view in the circumferential direction of another example of the protruding portion.
Figure 8C:
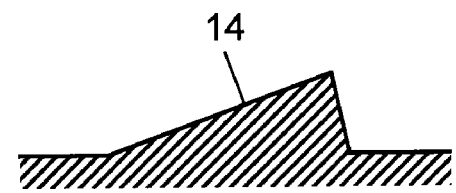
FIG. 8C is a sectional view in the circumferential direction of still another example of the protruding portion.
Figure 8D:
FIG. 8D is a sectional view in the circumferential direction of yet another example of the protruding portion.
Figure 8E:
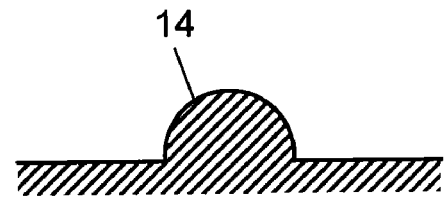
FIG. 8E is a sectional view in the circumferential direction of a further example of the protruding portion.

Furthermore, in the screw component and the image capturing device in accordance with the above-mentioned exemplary embodiment, as shown FIG. 8A, a case in which protruding portions 14 and 15 are formed such that a cross section in the circumferential direction has a rectangular shape. However, the shape is not limited to this case, and, for example, as shown in FIG. 8B, a protruding portion may have a cross-sectional shape having a rounded top part. Furthermore, as shown in FIG. 8C, a protruding portion may have a triangular cross-sectional shape having two sides whose tilt angles are different. Furthermore, as shown in FIG. 8D, a protruding portion may have a triangular cross-sectional shape. Furthermore, as shown in FIG. 8E, a protruding portion may have a semi-circular cross-sectional shape.

Furthermore, in the screw component and the image capturing device in accordance with the present invention, the length in the circumferential direction of protruding portions 14 and 15 is not necessarily limited to the above-mentioned exemplary embodiment. That is to say, the length may be shorter in the circumferential direction, and on the contrary, the length may be longer. When the length is longer, it may be beyond one round of spiral of screw threads 8 and 11.

Furthermore, the screw component in accordance with the present invention can be employed for not only lens holder 2 and lens barrel component 3 of an image capturing device but also other screw components including a pair of screw members engaged with each other.

INDUSTRIAL APPLICABILITY

A screw component in accordance with the present invention can prevent a pair of screw members engaged with each other from being displaced from each other. Therefore, for example, it is useful to be used for high-accuracy devices such as a lens holder and a lens barrel component of an image capturing device that is required to capture high-quality images.

REFERENCE MARKS IN THE DRAWINGS 1 lens
2 lens holder
3 lens barrel component
4 image capturing element
5 screw portion of lens holder 2
6 screw portion of lens barrel component 3
7 substrate
8, 8A screw thread of lens holder 2
9, 10 flank of screw thread 8
11 screw thread of lens barrel component 3
12, 13 flank of screw thread 11
14, 14A, 15, 15A protruding portion
16 screw thread piece

The invention claimed is:

1. A screw component comprising:
a pair of screw members engaged with each other; and
a plurality of protruding portions provided on each of both flanks of a screw thread of one screw member of the pair of screw members,
wherein the protruding portions on one of the flanks are arranged alternately with respect to the protruding portions on the other flank along the screw thread of the one screw member, and
wherein when the one screw member is engaged with the other screw member of the pair of screw members, the protruding portions provided alternately are brought into contact with flanks of a screw thread of the other screw member.

2. The screw component of claim 1,
wherein the protruding portions are provided on the both flanks of the screw thread of the one screw member at every pitch of the screw thread of the one screw member.

3. An image capturing device comprising a screw component according to claim 2, which includes:
a lens holder holding a lens inside thereof; and
a lens barrel component engaged with the lens holder, and holding the lens holder,
wherein the pair of screw members are the lens holder and the lens barrel component.

4. The screw component of claim 1,
wherein the protruding portions are provided at equal intervals along a circumferential direction.

5. An image capturing device comprising a screw component according to claim 4, which includes:
a lens holder holding a lens inside thereof; and
a lens barrel component engaged with the lens holder, and holding the lens holder,
wherein the pair of screw members are the lens holder and the lens barrel component.

6. The screw component of claim 1,
wherein the one screw member includes the screw thread formed into a discontinuous configuration.

7. An image capturing device comprising a screw component according to claim 6, which includes:
a lens holder holding a lens inside thereof; and
a lens barrel component engaged with the lens holder, and holding the lens holder,
wherein the pair of screw members are the lens holder and the lens barrel component.

8. An image capturing device comprising a screw component according to claim 1, which includes:
a lens holder holding a lens inside thereof; and
a lens barrel component engaged with the lens holder, and holding the lens holder,
wherein the pair of screw members are the lens holder and the lens barrel component.

* * * * *